(12) United States Patent
Sterns et al.

(10) Patent No.: US 9,483,402 B2
(45) Date of Patent: Nov. 1, 2016

(54) METHODS AND SYSTEMS FOR DYNAMICALLY CONTROLLED CACHING

(71) Applicant: NETAPP, INC., Sunnyvale, CA (US)

(72) Inventors: Randolph Wesley Sterns, Arvada, CO (US); Mark Edward Regester, Maize, KS (US); Kevin Lee Kidney, Lafayette, CO (US); Yulu Diao, Bel Aire, KS (US)

(73) Assignee: NETAPP, INC., Sunnyvale, CA (US)

( * ) Notice: Subject to any disclaimer, the term of this patent is extended or adjusted under 35 U.S.C. 154(b) by 61 days.

(21) Appl. No.: 14/494,731

(22) Filed: Sep. 24, 2014

(65) Prior Publication Data
US 2016/0085674 A1    Mar. 24, 2016

(51) Int. Cl.
*G06F 13/00* (2006.01)
*G06F 12/08* (2016.01)

(52) U.S. Cl.
CPC ....... *G06F 12/0804* (2013.01); *G06F 12/0871* (2013.01); *G06F 12/0895* (2013.01)

(58) Field of Classification Search
None
See application file for complete search history.

(56) References Cited

U.S. PATENT DOCUMENTS

| | | | |
|---|---|---|---|
| 5,664,106 A * | 9/1997 | Caccavale | G06F 11/32 709/224 |
| 8,402,226 B1 * | 3/2013 | Faibish | G06F 12/0804 710/52 |
| 9,058,282 B2 * | 6/2015 | Biswas | G06F 12/0884 |
| 9,063,864 B2 * | 6/2015 | Chang | G06F 3/0619 |
| 9,218,281 B2 * | 12/2015 | Cohen | G06F 12/0246 |

\* cited by examiner

*Primary Examiner* — Sean D Rossiter
(74) *Attorney, Agent, or Firm* — Haynes and Boone, LLP

(57) ABSTRACT

Systems and methods for improving caching mechanisms in a storage system are disclosed. The method includes storing data associated with a write input/output (I/O) request at a cache; determining an amount of dirty data stored in the cache, where the dirty data is data in the cache that has not yet been written to a persistent storage location managed by a storage system; determining if the amount of dirty data exceeds a threshold value; determining a cache flush rate based on the amount of dirty data stored at the cache, when the amount of dirty data exceeds the threshold value; and writing data from the cache at the determined cache flush rate to the persistent storage location.

20 Claims, 6 Drawing Sheets

METHODS AND SYSTEMS FOR DYNAMICALLY CONTROLLED CACHING

TECHNICAL FIELD

The present disclosure pertains to storage systems, and more particularly to caching mechanisms used by the storage systems.

BACKGROUND

A network storage server is a processing system that is used to store and retrieve data on behalf of one or more hosts on a network. A storage server operates on behalf of one or more hosts to store and manage data in a set of mass storage devices, e.g., magnetic or optical storage-based disks, solid state devices, or tapes. Some storage servers are designed to service file-level requests from hosts, as is commonly the case with file servers used in network attached storage (NAS) environments. Other storage servers are designed to service block-level requests from hosts, as with storage controllers used in a storage area network (SAN) environment. Still other storage servers are capable of servicing both file-level requests and block-level requests.

To improve the operation of storage systems, frequently used or potentially used data is often stored in a data cache made up of relatively fast, persistent or transitory memory, such as flash, random access memory (RAM), solid state memory, or the like. This data cache may also be used when receiving write data from an application to be stored at a storage device managed by a storage system. This received data may be held in cache until system resources allow it to be written to persistent storage (also known as being "flushed") or for other reasons. Cache flushing that is aggressive generally provides high performance for small block write operations. Aggressive cache flushing can introduce problems with overall storage system operation by delaying read operations, however. This can hurt system performance benchmarks, such as SPC-1 results. SPC-1 is a generally understood benchmark from the Storage Performance Council that consists of a single workload designed to demonstrate the performance of a storage subsystem while performing the typical functions of business critical applications, characterized by predominately random input/output (I/O) operations and requires both queries as well as update operations. Examples of those types of applications include database operations, mail server implementations, and others.

Continuous efforts are being made to improve the overall performance of storage systems and caching operations.

SUMMARY

In one aspect, a machine implemented method is provided. The method includes storing data associated with a write input/output (I/O) request at a cache; determining an amount of dirty data stored in the cache, where the dirty data is data in the cache that has not yet been written to a persistent storage location managed by a storage system; determining if the amount of dirty data exceeds a threshold value; determining a cache flush rate based on the amount of dirty data stored at the cache, when the amount of dirty data exceeds the threshold value; and writing data from the cache at the determined cache flush rate to the persistent storage location.

In another aspect, a system having a memory with machine readable medium comprising machine executable code having stored thereon instructions is provided. A processor module coupled to the memory, is configured to execute the machine executable code to: store data associated with a write input/output (I/O) request at a cache; determine an amount of dirty data stored in the cache, where the dirty data is data in the cache that has not yet been written to a persistent storage location managed by a storage system; determine if the amount of dirty data exceeds a threshold value; determine a cache flush rate based on the amount of dirty data stored at the cache, when the amount of dirty data exceeds the threshold value; and write data from the cache at the determined cache flush rate to the persistent storage location.

In yet another aspect, a non-transitory, machine readable storage medium having stored thereon instructions for performing a method is provided. The machine executable code which when executed by at least one machine, causes the machine to: store data associated with a write input/output (I/O) request at a cache; determine an amount of dirty data stored in the cache, where the dirty data is data in the cache that has not yet been written to a persistent storage location managed by a storage system; determine if the amount of dirty data exceeds a threshold value; determine a cache flush rate based on the amount of dirty data stored at the cache, when the amount of dirty data exceeds the threshold value; and write data from the cache at the determined cache flush rate to the persistent storage location This brief summary has been provided so that the nature of this disclosure may be understood quickly. A more complete understanding of the disclosure can be obtained by reference to the following detailed description of the various aspects thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As a preliminary note, the terms "component", "module", "system," and the like as used in this disclosure are intended to refer to a computer-related entity, either programmable instructions-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

Generally, systems and methods disclosed herein provide improved cache management and flushing to provide relatively high input/output operations per second (IOPs) without sacrificing SPC-1 performance results.

Figure 1:
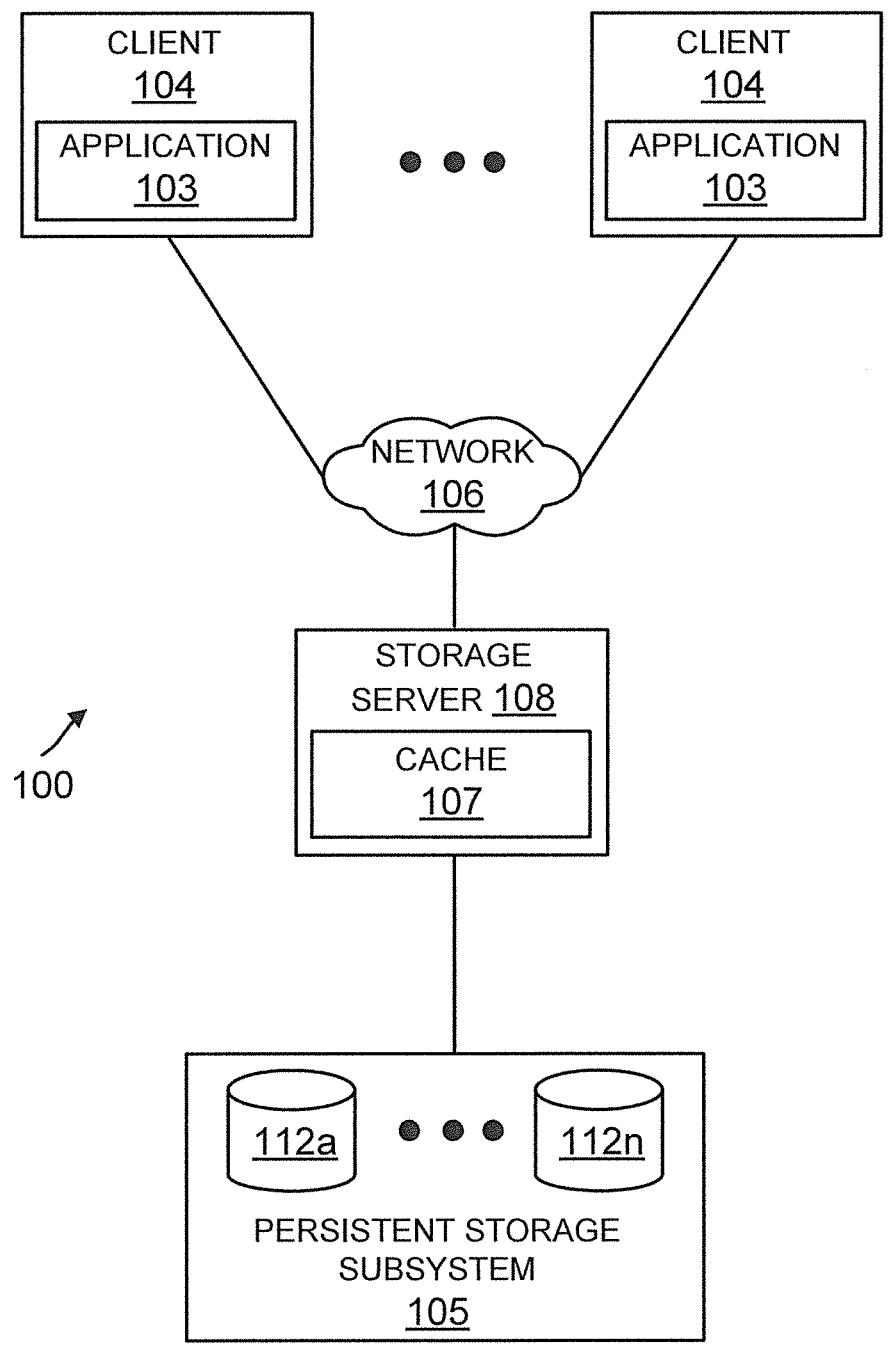
FIG. 1 is a block diagram illustrating an example of a network storage system, according to one aspect.

System 100:

FIG. 1 is a block diagram illustrating an example network storage system 100 (or configuration) in which the technology introduced herein can be implemented. The configuration described with respect to FIG. 1 is for illustration of a type of configuration in which the technology described herein can be implemented. As would be recognized by one skilled in the art, other network storage configurations could be used for implementing the technology disclosed herein.

As illustrated in the example of FIG. 1, the network storage system 100 includes multiple client systems 104, a storage server 108, and a network 106 connecting the client systems 104 and the storage server 108. The storage server 108 is coupled with a number of mass storage devices (or storage containers) 112 in a mass storage subsystem 105. Some or all of the mass storage devices 112a-112n can be various types of storage devices, e.g., hard disk drives (HDDs), flash memory, solid-state drives (SSDs), hybrid storage drives (sometimes referred to as SSHDs), optical drives, tape storage, etc. For ease of description, the storage devices 112a-112n are discussed as disks herein. However as would be recognized by one skilled in the art, other types of storage devices could be used.

Although illustrated as distributed systems, in some aspects the storage server 108 and the mass storage subsystem 105 can be physically contained and/or otherwise located in the same enclosure. For example, the storage system 108 and the mass storage subsystem 105 can together be one of the E-series storage system products available from NetApp®, Inc., the assignee of the present application. The E-series storage system products can include one or more embedded controllers (or storage servers) and disks. Furthermore, the storage system can, in some aspects, include a redundant pair of controllers that can be located within the same physical enclosure with the disks. The storage system can be connected to other storage systems and/or to disks within or outside of the enclosure via a serial attached SCSI (SAS)/Fibre Channel (FC) protocol. Other protocols for communication are also possible including combinations and/or variations thereof.

In another aspect, the storage server 108 can be, for example, one of the FAS-series of storage server products available from NetApp®, Inc. The client systems 104 can be connected to the storage server 108 via the network 106, which can be a packet-switched network, for example, a local area network (LAN) or a wide area network (WAN). Further, the storage server 108 can be connected to the storage devices 112a-112n via a switching fabric (not illustrated), which can be a fiber distributed data interface (FDDI) network, for example. It is noted that, within the network data storage environment, any other suitable number of storage servers and/or mass storage devices, and/or any other suitable network technologies, may be employed.

The storage server 108 can make some or all of the storage space on the storage devices 112 available to the client systems 104 in a conventional manner. For example, each of the storage devices 112 can be implemented as an individual disk, multiple disks (e.g., a Redundant Array of Independent (or Inexpensive) Disks (RAID) group) or any other suitable mass storage device(s) including combinations and/or variations thereof. Storage of information in the mass storage subsystem 105 can be implemented as one or more storage volumes that comprise a collection of physical storage devices 112 cooperating to define an overall logical arrangement of volume block number (VBN) space on the volume(s). Each logical volume is generally, although not necessarily, associated with its own file system.

The storage devices within a logical volume/file system are typically organized as one or more groups, wherein each group may be operated as a RAID. Most RAID implementations, e.g., a RAID-6 level implementation, enhance the reliability/integrity of data storage through the redundant writing of data "stripes" across a given number of physical disks in the RAID group, and the appropriate storing of parity information with respect to the striped data. In computer data storage, data striping is a technique of segmenting logically sequential data, such as a file, so that consecutive segments are stored on different physical storage devices. Striping is useful when a processing device requests data more quickly than a single storage device can provide it. By spreading segments across multiple devices which can be accessed concurrently, total data throughput is increased. It is also a useful method for balancing I/O load across an array of disks. In conjunction with this, a "stripe" herein may refer to a block of data in data striping. An illustrative example of a RAID implementation is a RAID-6 level implementation, although it should be understood that other types and levels of RAID implementations may be used according to the technology described herein. One or more RAID groups together form an aggregate. An aggregate can contain one or more volumes.

The storage server 108 can receive and respond to various read and write requests from applications 103 running on the client systems (or clients) 104, directed to data stored in or to be stored in the storage subsystem 105.

Although the storage server 108 is illustrated as a single unit in FIG. 1, it can have a distributed architecture. For example, the storage server 108 can be designed as a physically separate network module (e.g., "N-blade") and disk module (e.g., "D-blade") (not illustrated), which communicate with each other over a physical interconnect. Such an architecture allows convenient scaling, e.g., by deploying two or more N-blades and D-blades, all capable of communicating with each other through the physical interconnect.

The storage server 108 can be configured to implement one or more virtual storage servers. Virtual storage servers allow the sharing of the underlying physical storage controller resources, (e.g., processors and memory, between virtual storage servers while allowing each virtual storage server to run its own operating system) thereby providing functional isolation. With this configuration, multiple server operating systems that previously ran on individual servers, (e.g., to avoid interference) are able to run on the same physical server because of the functional isolation provided by a virtual storage server implementation. This can be a more cost effective way of providing storage server solutions to multiple customers than providing separate physical servers for each customer.

As illustrated in the example of FIG. 1, storage server 108 includes a cache 107. The cache 107 can include, for example, a flash memory. The use of cache 107 is described below in detail. Although illustrated in combination, cache 107 can be implemented separately from the storage server 108. Alternatively or additionally, cache 107 can be physically and/or functionally distributed.

Figure 2A:
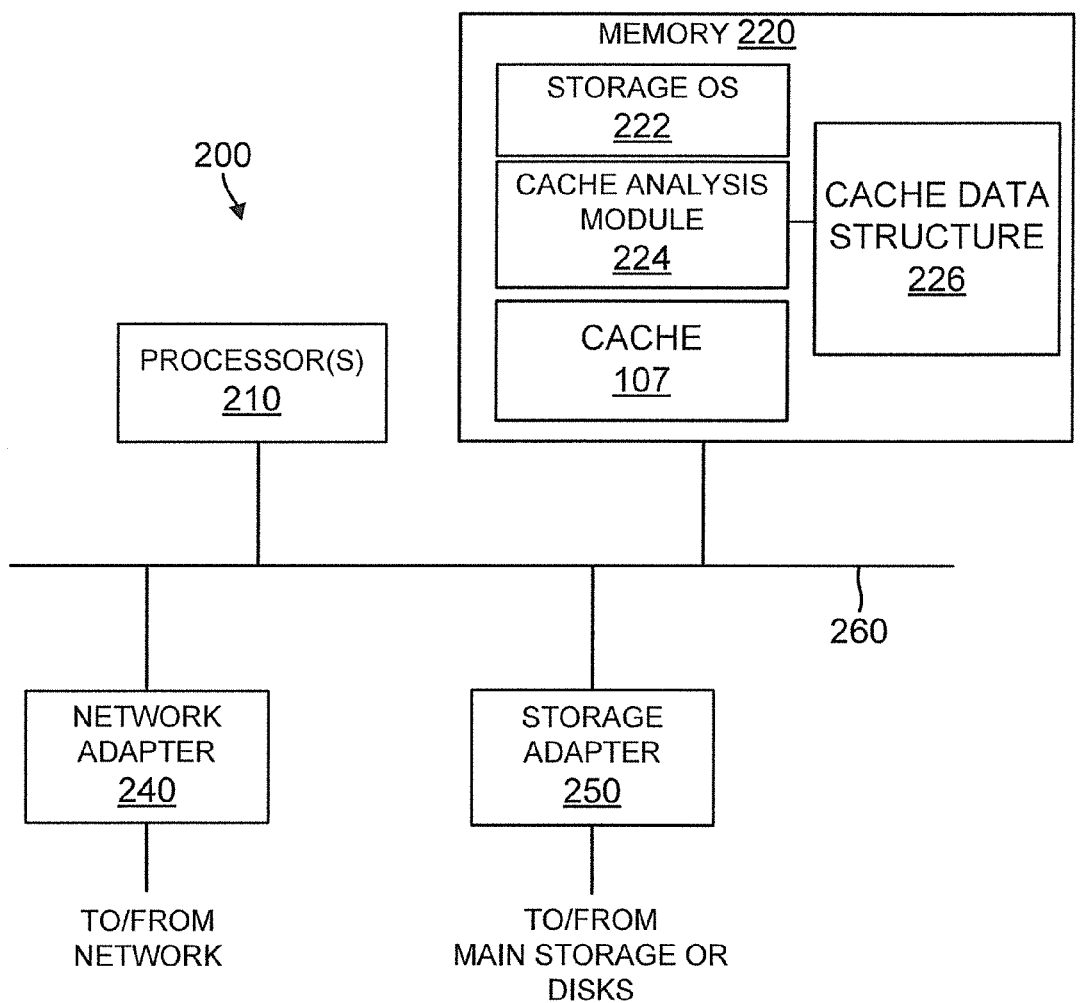
FIG. 2A is a block diagram illustrating an example of a storage controller that can implement one or more network storage servers, according to one aspect of the present disclosure.

Storage Controller:

FIG. 2A is a block diagram illustrating an example of the architecture of a storage controller 200 that can implement one or more network storage servers, for example, storage server 108 of FIG. 1. As described above, the storage server is a processing system that provides storage services relating to the organization of information at storage devices 112a-112n of the mass storage subsystem 105. In an illustrative aspect, the storage server 108 includes a processor subsystem 210 that includes one or more processors. The storage server 108 further includes a memory 220, a network adapter 240, and a storage adapter 250, at least some of which can be interconnected by an interconnect 260, e.g., a physical interconnect. Interconnect 260 may include a bus, for example.

The interconnect 260 is an abstraction that represents any one or more separate physical buses, point-to-point connections, or both, connected by appropriate bridges, adapters, or controllers. The interconnect 260, therefore, may include, for example, a system bus, a form of Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire," Fibre-Channel, Thunderbolt, and/or any other suitable form of physical connection including combinations and/or variations thereof.

The storage server 108 can be embodied as a single or multi-processor storage server executing a storage operating system (may also be referred to as controller firmware) 222 that preferably implements a high-level module, called a storage manager, to logically organize data as a hierarchical structure of named directories, files, and/or data "blocks" on the storage devices 112a-112n. A block can be a sequence of bytes of specified length.

The memory 220 illustratively comprises storage locations that are addressable by the processor(s) 210 and adapters 240 and 250 for storing software program code and data associated with the technology introduced here. For example, some of the storage locations of memory 220 can be used to store a cache analysis module 224, which may include a cache data structure 226. Portion of the memory may be used as a cache 107. Details regarding caching analysis module 224 and using cache 107 are provided below.

The storage operating system 222, portions of which are typically resident in memory and executed by the processing elements, functionally organizes the storage server 108 by (among other functions) invoking storage operations in support of the storage service provided by the storage server 108. It will be apparent to those skilled in the art that other processing and memory implementations, including various other non-transitory media, e.g., computer readable media, may be used for storing and executing program instructions pertaining to the technology introduced here. Similar to the storage server 108, the storage operating system 222 can be distributed, with modules of the storage system running on separate physical resources.

The network adapter 240 can include multiple ports to couple the storage server 108 with one or more clients 104, or other storage servers, over point-to-point links, wide area networks, virtual private networks implemented over a public network (Internet) or a shared local area network. The network adapter 240 thus can include the mechanical components as well as the electrical and signaling circuitry needed to connect the storage server 108 to the network 106. Illustratively, the network 106 can be embodied as an Ethernet network, a Fibre Channel network or any other network type. Each client 104 can communicate with the storage server 108 over the network 106 by exchanging packets or frames of data according to pre-defined protocols, e.g., Transmission Control Protocol/Internet Protocol (TCP/IP). It is noteworthy that clients 104 may be coupled to the storage server 108 directly without having to go through a network adapter or network 106. The various aspects described herein are not limited to a network or a direct connection.

The storage adapter 250 cooperates with the storage operating system 222 to access information requested by clients 104. The information may be stored on any type of attached array of writable storage media, e.g., magnetic disk or tape, optical disk (e.g., CD-ROM or DVD), flash memory, SSID, HDD, SSID, RAM, micro-electro mechanical and/or any other similar media adapted to store information, including data and parity information. However, as illustratively described herein, the information is stored on storage devices 112. The storage adapter 250 includes multiple ports having I/O interface circuitry that couples with the disks over an I/O interconnect arrangement, e.g., a conventional high-performance, Fibre Channel link topology.

The storage operating system 222 facilitates clients' access to data stored on the storage devices 112. In certain aspects, the storage operating system 222 implements a write-anywhere file system that cooperates with one or more virtualization modules to "virtualize" the storage space provided by storage devices 112a-112n. In certain aspects, a storage manager element (for example, 410, FIG. 4) of the storage operation system 222 logically organizes the information as a hierarchical structure of named directories and files on the storage devices 112. Each "on-disk" file may be implemented as a set of disk blocks configured to store information. As used herein, the term "file" means any logical container of data. The virtualization module(s) may allow the storage manager 410 to further logically organize information as a hierarchical structure of blocks on the disks that are exported as named logical units.

As set forth generally above, some of the storage locations of memory 220 can be used to implement a cache 107. Cache 107 generally is not visible to client systems 104 or their applications 103 but may be managed by storage operating system 222 to provide temporary data storage for items being read from or written to persistent storage subsystem 105. Cache 107 can be particularly helpful to reduce the number of I/O operations communicated to and from persistent storage subsystem 105, which is often made up of slower memory.

Cache analysis module 224, in one aspect, manages the use of cache 107 and stores information (or metadata) about the amount of cache that is in use, the amount of data in the cache that is "dirty" (i.e., has not been written to permanent storage), and the like. Further, cache analysis module 224, in one aspect, sets the rate at which the cache is flushed to persistent storage subsystem 105. In one aspect, cache data structure 226 managed by cache analysis module 224 includes information about cache 107 and its usage. For example, cache data structure 226 may be used to store multiple threshold values that are used determine a transfer rate at which data is transferred from the cache 107 to persistent storage, as described below in detail. The use of multiple threshold and transfer rates allows one to adapt to different operating environments.

In a data striping implementation, cache 107 will typically store one or more data stripes in full, and cache analysis module 224 may help decide when to flush each data stripe. In other aspects, however, it will be understood that data blocks of various sizes may be stored in cache and flushed to persistent storage without departing from the teachings herein.

Figure 2B:
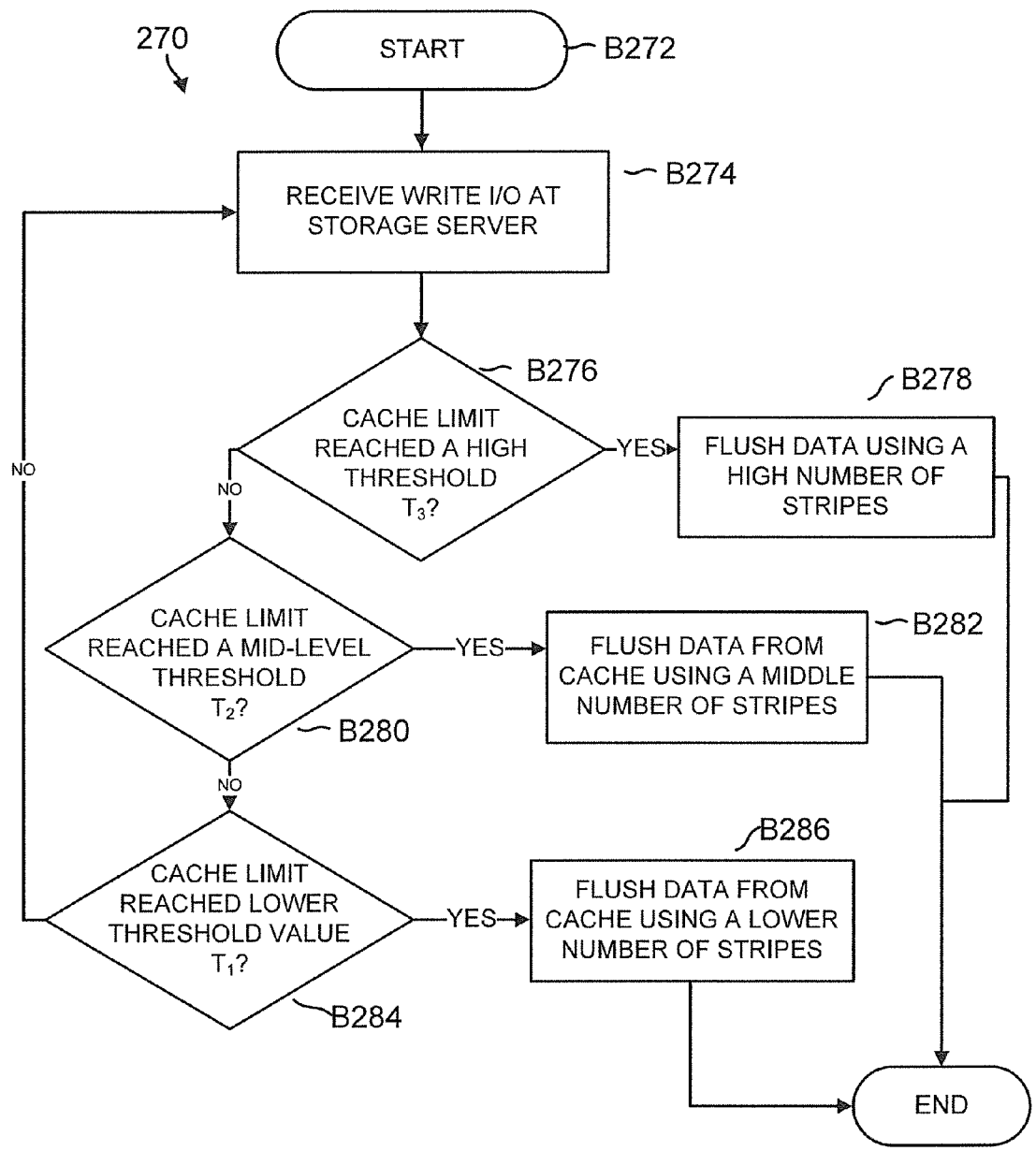
FIGS. 2B and 2C show process flows according to the various aspects of the present disclosure.

FIG. 2B illustrates a block diagram of a method 270 in accordance with one aspect of the present disclosure. Starting at block B272, a storage system is initiated and operational with an operational cache (107) as well as persistent data storage (112). At block B274, the storage system receives a write I/O request from a client system application or any other entity. At block B276, the storage system, specifically, in one aspect, cache analysis module 224, determines whether the cache usage limit (or capacity) has reached a high threshold value, $T_3$. In one aspect, this threshold value may be, for example, 80% of the total cache used capacity of cache 107. In another aspect, the threshold value may be 80% of the dirty write data as compared to a defined maximum allowable amount of dirty write data that can be stored at cache 107, which may be smaller than the total amount of cache available.

If the cache capacity usage has reached that threshold, at block B278, the storage system flushes dirty data from the cache at a high rate. The cache flush rate may be considered the amount of data (or number of data stripes) that are transferred to persistent storage in a given amount of time. In one aspect, for example, the cache flush rate may comprise transferring 32 stripes/cycle or greater above an 80% dirty write high threshold. In one aspect, this may be achieved by triggering multiple I/O write operations for the persistent storage. In another aspect, the transfer rate may fluctuate based on the size of the I/O write operation request(s). In yet another aspect, one or more I/O write operations for transferring dirty cache data to persistent storage may receive higher priority than other communications traffic. Additionally, combinations of the number, size, and/or priority of I/O write operations may contribute to the overall cash flush rate.

If the cache capacity usage has not reached the threshold $T_3$, the system (cache analysis module 224) in block B280, determines whether the cache capacity usage has reached a mid-level threshold $T_2$. In one aspect, this mid-level threshold value may be 50% of the total cache capacity usage, for example. If the mid-level threshold value has been reached, at block B282, the storage system flushes data from the cache using a moderate transfer rate, for example, 17 stripes/cycle. If not, then in block B284, the system determines whether the cache usage limit has reached a low threshold value, $T_1$. In one aspect, this low threshold value may be 20% of the total cache capacity usage, for example. If the low threshold value has been reached, at block B286, the storage system flushes data from the cache using a low transfer rate, for example, 2 stripes/cycle. If even the low $T_1$ threshold has not been reached, then in one aspect, no flushing may be performed.

It is noteworthy that the number and level of the threshold values $T_1$, $T_2$, and $T_3$, described herein are examples only. In one aspect, there may be more threshold determinations associated with different flushing rates. Furthermore, thresholds as described herein, with respect to FIGS. 2B (and 2C below) may vary and, in one aspect, are configurable. For example, a system administrator may be able to set threshold levels and flush rates as desired. The cache flush rates may comprise lower limits, upper bounds, and/or median flush rates. As illustrated more fully with respect to FIGS. 3A-3D, the flushing rates will generally increase as the dirty cache increases, but the correlation can be in a variety of ways.

Figure 2C:
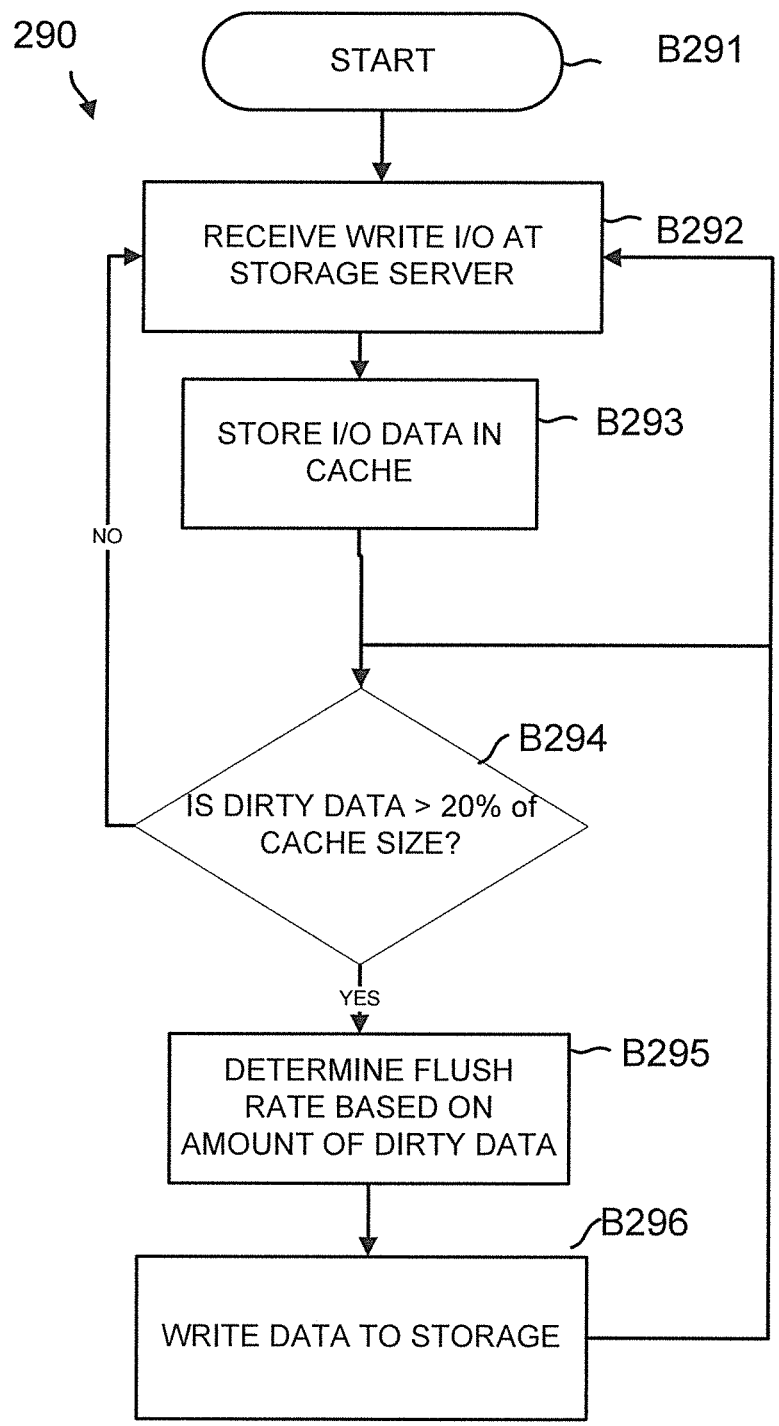

FIG. 2C provides a method in accordance with another aspect of the disclosure. The method 290 of FIG. 2C begins at block B291 with an initiated and operational storage system managing cache and persistent data storage. At block B292, the storage server receives a write I/O command. At block B293, the storage server saves the command's data to the cache 107 and, in one aspect, updates the caching data structure 226, such as that shown in FIG. 2A. At block B294, the storage server determines whether the amount of dirty data in the cache has exceeded a flushing threshold value, which may be 20%. If it has not, no flushing is required, and the process returns to block B292 to process additional write I/O commands. The 20% flushing threshold is illustrative only and may be lower or higher in particular aspects and may be configurable in some cases.

If the amount of dirty cache has exceeded the threshold value, then the storage server begins to flush the cache to persistent storage. At block B295, the storage server determines the flush rate (i.e. the rate at which data is transferred from cache 107 to storage 112), which, at least in part, may be determined by the amount of dirty data in the cache. This determination may be made in a number of ways in various aspects. For example, cache data structure 226 may include a look-up table that provides a percentage of dirty cache or a percentage range tied to a flushing rate. In another aspect, a look-up table may be based on dirty cache size in bytes, kilobytes, megabytes, gigabytes, or the like, rather than percentage numbers. In another aspect, the flushing rate may be determined by a function or algorithm having an input of the size of the dirty cache, the total size of the cache, and the like. In yet another aspect, such an algorithm may use other input as well, such as the levels of resource usage of the storage system and/or storage server, levels of network traffic, and/or the like. Specifically, for example, a function may be used to determine the flush rate that includes input of the amount of dirty data in the cache and a defined maximum allowable amount of dirty write data (which may be combined to provide a percentage of allowable dirty cache). In one aspect, this function may define a generally linear relationship for a certain range of inputs (for example, between 20% and 80% dirty cache). Further, for example, a generally linear relationship may further exist for another range of input but exhibit a higher slope (for example, between 80% and 100% dirty cache). Other example functions are described below with respect to FIGS. 3A-3D.

Similar to the aspects described above with respect to FIG. 2B, the flush rate will generally increase as the amount of dirty data in the cache increases. At block B296, dirty cache data is written to persistent storage. The process then returns to block B292 to receive additional write I/Os or returns to block B294 to continue flushing cache.

Flushing data at a lower rate lessens the impact on storage system resources, as related to the processing of read I/O requests, for example. Using a low flush rate will improve SPC-1 results. In one aspect, when the cache reaches a higher threshold, such as approximately 80%, large amounts of write I/Os are likely occurring and more aggressive flushing is desired. In one aspect, a flushing rate may increase to over 350% of the levels that would be expected in a current RAID-6 implementation, which can help improve 4K random write IOPs.

Figure 3B:
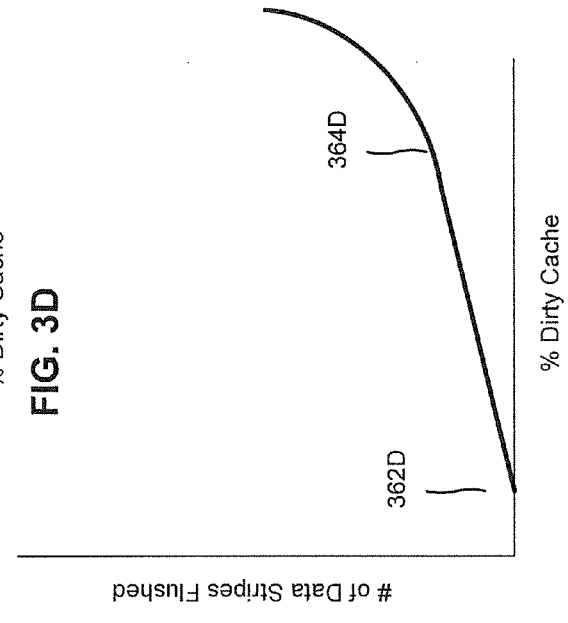
FIGS. 3A-3D provide illustrative cache usage versus flushing rate graphs according to the various aspects of the present disclosure.
Figure 3A:
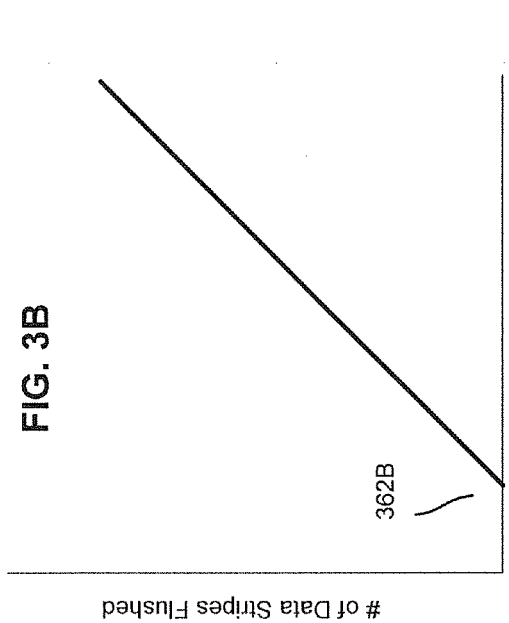
Figure 3D:
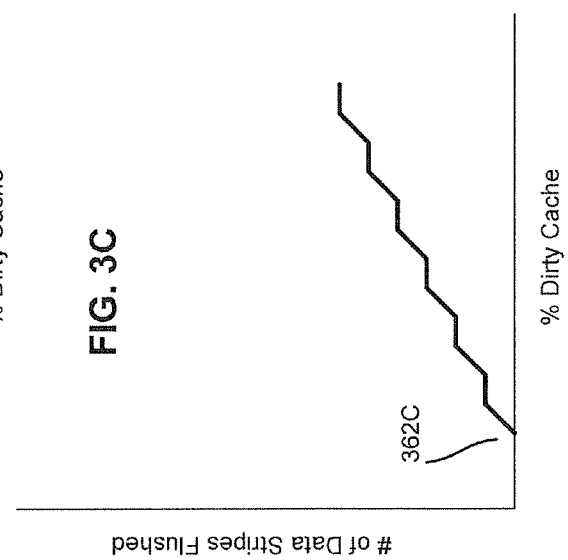
Figure 3C:
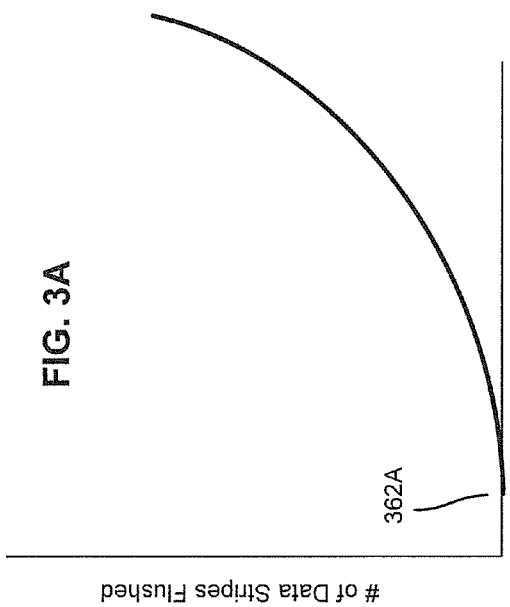

FIGS. 3A-3D illustrate sample graphs of approximate relationships between the cache usage and cache flushing rates as described here in various aspects. In one aspect, for example, as the percentage of cache that is considered dirty increases (from left to right along the X-axis), the number of stripes flushed at a given time increases exponentially, or approximately so (see FIG. 3A). In another aspect, the percentage of dirty cache will vary linearly with the number of data stripes flushed (FIG. 3B). In yet another aspect, the percentage of dirty cache will vary with the number of data stripes flushed in a stepped manner (FIG. 3C). It is also contemplated that combinations of these examples may be suitable for still other aspects. For example, the graph of FIG. 3D illustrates a generally linear approach at lower levels of dirty cache but an exponential increase after reaching a certain inflection point (364D). As illustrated, the graphs show a zero-level caching rate until reaching a threshold (362A-362D respectively) dirty cache level, such as is described with respect to FIGS. 2B and 2C. Additionally, the relationship between the dirty cache level and the data flushing rate may further illustrate one or more inflection points (364D) where the relationship between the cache level and the data rate changes from one general algorithm to another.

Figure 4:
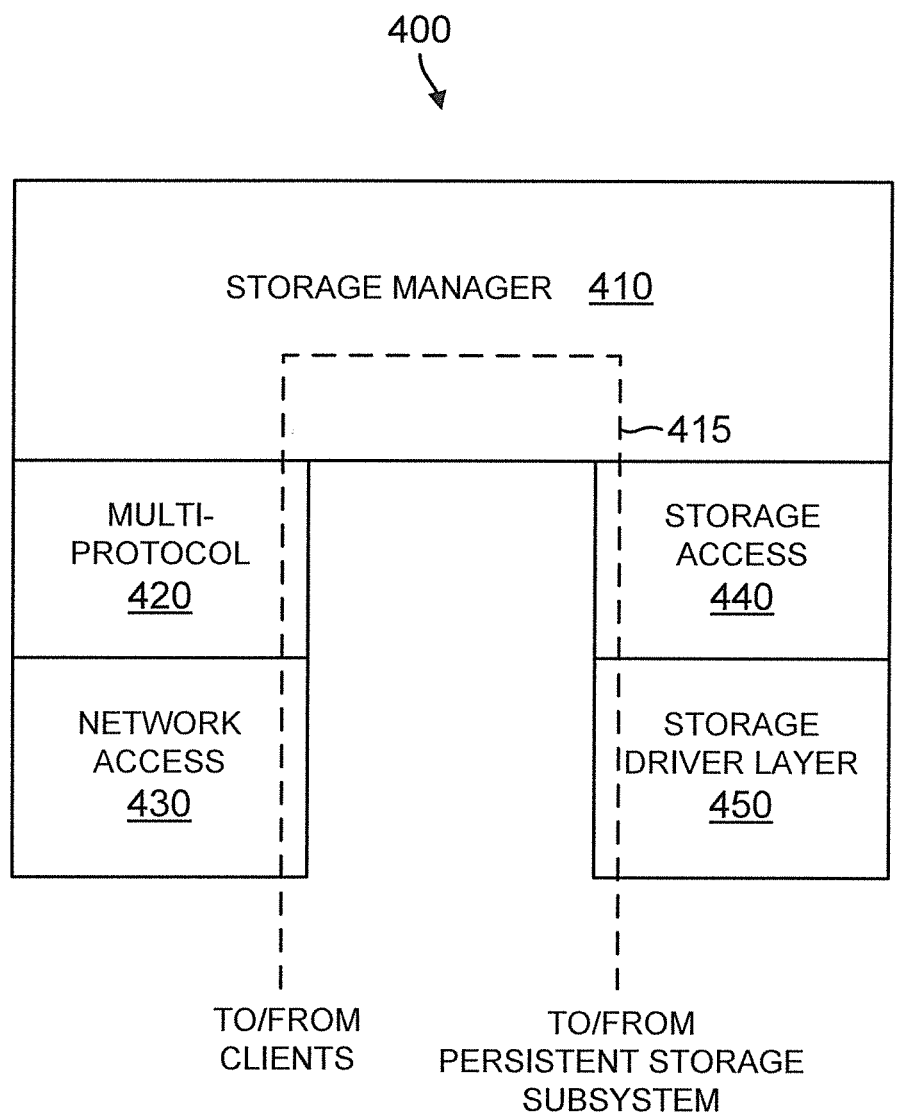
FIG. 4 is a schematic diagram illustrating an example of the architecture of a storage operating system, according to one aspect of the present disclosure.

Storage Operating System:

FIG. 4 is a schematic diagram illustrating an example of the architecture 400 of a storage operating system 222 for use in a storage server 108. In some aspects, the storage operating system 222 can include NetApp® E-Series controller firmware or the NetApp® Data ONTAP® operating system available from NetApp, Inc., Sunnyvale, Calif. that implements a Write Anywhere File Layout (WAFL®) file system (without derogation of any trademark rights). However, another storage operating system may alternatively be designed or enhanced for use in accordance with the technology described herein.

The storage operating system 222 can be implemented as programmable circuitry programmed with software and/or firmware, or as specially designed non-programmable circuitry (i.e., hardware), or in a combination and/or variation thereof. In the illustrated aspect, the storage operating system 222 includes several modules, or layers. These layers include a storage manager (or file system manager) 410, which is a functional element of the storage operating system 222. The storage manager 410 imposes a structure (e.g., one or more file systems) on the data managed by the storage server 108 and services read and write requests from clients 104.

To allow the storage server to communicate over the network 106 (e.g., with clients 104), the storage operating system 222 can also include a multi-protocol layer 420 and a network access layer 430, logically under the storage manager 410. The multi-protocol layer 420 implements various higher-level network protocols, e.g., Network File System (NFS), Common Internet File System (CIFS), Hypertext Transfer Protocol (HTTP), Fibre Channel, Infini-Band, Serial Attached Small Computer System Interface (SAS) and/or Internet small computer system interface (iSCSI), to make data stored on the storage devices 112 available to users and/or application programs. The network access layer 430 includes one or more network drivers that implement one or more lower-level protocols to communicate over the network, e.g., Ethernet, Internet Protocol (IP), TCP/IP, Fibre Channel Protocol and/or User Datagram Protocol/Internet Protocol (UDP/IP).

Also, to allow the device to communicate with a storage subsystem (e.g., storage subsystem 105 of FIG. 1), the storage operating system 222 includes a storage access layer 440 and an associated storage driver layer 450 logically under the storage manager 410. The storage access layer 440 implements a higher-level storage redundancy algorithm, e.g., RAID-4, RAID-5, RAID-6, or RAID DP®. The storage driver layer 450 implements a lower-level storage device access protocol, e.g., Fibre Channel Protocol or SAS.

Also shown in FIG. 4 is the path 415 of data flow through the storage operating system 222, associated with a read or write operation, from the client interface to the storage interface. Thus, the storage manager 410 accesses a storage subsystem, e.g., storage system 105 of FIG. 1, through the storage access layer 440 and the storage driver layer 450. Clients 104 can interact with the storage server 108 in accordance with a client/server model of information delivery. That is, the client 104 requests the services of the storage server 108, and the storage server may return the results of the services requested by the client, by exchanging packets over the network 106. The clients may issue packets including file-based access protocols, such as CIFS or NFS, over TCP/IP when accessing information in the form of files and directories. Alternatively, the clients may issue packets including block-based access protocols, such as iSCSI and SCSI, when accessing information in the form of blocks.

The processes described herein are organized as sequences of operations in the flowcharts. However, it should be understood that at least some of the operations associated with these processes potentially can be reordered, supplemented, or substituted for, while still performing the same overall technique.

The technology introduced above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the technology introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc. The term "logic", as used herein, can include, for example, special-purpose hardwired circuitry, software and/or firmware in conjunction with programmable circuitry, or a combination thereof.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
storing data associated with a write input/output (I/O) request at a cache;
determining an amount of dirty data stored in the cache, where the dirty data is data in the cache that has not yet been written to a persistent storage location managed by a storage system;
determining if the amount of dirty data exceeds a threshold value;
determining a cache flush rate based on the amount of dirty data stored at the cache, when the amount of dirty data exceeds the threshold value, and wherein the cache flush rate is increased as the amount of dirty data increases and the cache flush rate varies linearly with respect to the amount of dirty data; and
writing data from the cache at the determined cache flush rate to the persistent storage location.

2. The machine implemented method of claim 1, wherein the threshold value is a percentage of the amount of dirty data compared to a total capacity of the cache.

3. The machine implemented method of claim 1, wherein a plurality of threshold values are used to determine cache usage and cache flush rates from the cache to the persistent storage location vary based on the plurality of threshold values.

4. The machine implemented method of claim 3, wherein the plurality of threshold values include a first threshold value, a second threshold value and a third threshold value, where the first threshold value is the highest and the third threshold value is the lowest.

5. A non-transitory, machine readable storage medium having stored thereon instructions for performing a method, comprising machine executable code which when executed by at least one machine, causes the machine to:
store data associated with a write input/output (I/O) request at a cache;
determine an amount of dirty data stored in the cache, where the dirty data is data in the cache that has not yet been written to a persistent storage location managed by a storage system;
determine if the amount of dirty data exceeds a threshold value;
determine a cache flush rate based on the amount of dirty data stored at the cache, when the amount of dirty data exceeds the threshold value and wherein the cache flush rate increases linearly with the increase in the amount of dirty data; and
write data from the cache at the determined cache flush rate to the persistent storage location.

6. The machine readable storage medium of claim 5, wherein the threshold value is a percentage of the amount of dirty data compared to a total capacity of the cache.

7. The machine readable storage medium of claim 5, wherein a plurality of threshold values are used to determine cache usage and cache flush rates from the cache to the persistent storage location vary based on the plurality of threshold values.

8. The machine readable storage medium of claim 7, wherein the plurality of threshold values include a first threshold value, a second threshold value and a third threshold value, where the first threshold value is the highest and the third threshold value is the lowest.

9. A system, comprising:
a memory containing machine readable medium comprising machine executable code having stored thereon instructions; and a processor module coupled to the memory, the processor module configured to execute the machine executable code to:
store data associated with a write input/output (I/O) request at a cache;
determine an amount of dirty data stored in the cache, where the dirty data is data in the cache that has not yet been written to a persistent storage location managed by a storage system;
determine if the amount of dirty data exceeds a threshold value;
determine a cache flush rate based on the amount of dirty data stored at the cache, when the amount of dirty data exceeds the threshold value and wherein the cache flush rate increases linearly as the amount of dirty data increases; and
write data from the cache at the determined cache flush rate to the persistent storage location.

10. The system of claim 9, wherein the threshold value is a percentage of the amount of dirty data compared to a total capacity of the cache.

11. The system of claim 9, wherein a plurality of threshold values are used to determine cache usage and cache flush rates from the cache to the persistent storage location vary based on the plurality of threshold values; and wherein the plurality of threshold values include a first threshold value, a second threshold value and a third threshold value, where the first threshold value is the highest and the third threshold value is the lowest.

12. A machine implemented method, comprising:
storing data associated with a write input/output (I/O) request at a cache;
determining an amount of dirty data stored in the cache, where the dirty data is data in the cache that has not yet been written to a persistent storage location managed by a storage system;
determining if the amount of dirty data exceeds a threshold value;
determining a cache flush rate based on the amount of dirty data stored at the cache, when the amount of dirty data exceeds the threshold value, and wherein the cache flush rate is increased as the amount of dirty data increases and the flush rate varies exponentially with respect to the amount of dirty data; and
writing data from the cache at the determined cache flush rate to the persistent storage location.

13. The machine implemented method of claim 12, wherein the threshold value is a percentage of the amount of dirty data compared to a total capacity of the cache.

14. The machine implemented method of claim 12, wherein a plurality of threshold values are used to determine cache usage and cache flush rates from the cache to the persistent storage location vary based on the plurality of threshold values.

15. A non-transitory, machine readable storage medium having stored thereon instructions for performing a method, comprising machine executable code which when executed by at least one machine, causes the machine to:

store data associated with a write input/output (I/O) request at a cache;

determine an amount of dirty data stored in the cache, where the dirty data is data in the cache that has not yet been written to a persistent storage location managed by a storage system;

determine if the amount of dirty data exceeds a threshold value;

determine a cache flush rate based on the amount of dirty data stored at the cache, when the amount of dirty data exceeds the threshold value and wherein the cache flush rate increases exponentially with the increase in the amount of dirty data; and write data from the cache at the determined cache flush rate to the persistent storage location.

16. The machine readable storage medium of claim 15, wherein the threshold value is a percentage of the amount of dirty data compared to a total capacity of the cache.

17. The machine readable storage medium of claim 15, wherein a plurality of threshold values are used to determine cache usage and cache flush rates from the cache to the persistent storage location vary based on the plurality of threshold values.

18. A system, comprising:
a memory containing machine readable medium comprising machine executable code having stored thereon instructions; and
a processor module coupled to the memory, the processor module configured to execute the machine executable code to:

store data associated with a write input/output (I/O) request at a cache;

determine an amount of dirty data stored in the cache, where the dirty data is data in the cache that has not yet been written to a persistent storage location managed by a storage system;

determine if the amount of dirty data exceeds a threshold value;

determine a cache flush rate based on the amount of dirty data stored at the cache, when the amount of dirty data exceeds the threshold value and wherein the cache flush rate increases exponentially as the amount of dirty data increases; and write data from the cache at the determined cache flush rate to the persistent storage location.

19. The system of claim 18, wherein the threshold value is a percentage of the amount of dirty data compared to a total capacity of the cache.

20. The system of claim 18, wherein a plurality of threshold values are used to determine cache usage and cache flush rates from the cache to the persistent storage location vary based on the plurality of threshold values.

* * * * *